United States Patent [19]

Black et al.

[11] 4,451,592

[45] May 29, 1984

[54] RESIN MODIFICATION FOR GLASS FIBER ADHERENCE

[75] Inventors: Denny E. Black; David W. Garrett, both of Newark; Thomas A. Coakley, Heath, all of Ohio

[73] Assignee: Owens-Corning Fiberglas Corporation, Toledo, Ohio

[21] Appl. No.: 455,788

[22] Filed: Jan. 6, 1983

[51] Int. Cl.$^3$ ............................................. C08K 5/09
[52] U.S. Cl. ............................. 523/206; 524/160; 524/285; 524/287; 524/296; 524/298; 524/300
[58] Field of Search ............... 523/206; 524/285, 160, 524/296, 298, 300, 287

[56] References Cited

U.S. PATENT DOCUMENTS

| | | | |
|---|---|---|---|
| 3,909,477 | 9/1975 | Madison et al. | 524/285 |
| 3,936,415 | 2/1976 | Coakley | 523/206 |
| 4,278,586 | 7/1981 | Marzola et al. | 524/285 |
| 4,338,234 | 7/1982 | Moore et al. | 523/206 |

*Primary Examiner*—Lewis T. Jacobs
*Attorney, Agent, or Firm*—Ronald C. Hudgens; Greg Dziegielewski; Philip R. Cloutier

[57] ABSTRACT

A method for improving the adhesiveness between a polyolefin resin and a sized glass fiber which comprises forming a mixture of the resin, a fiber and an organic acid and molding the mixture.

10 Claims, No Drawings

RESIN MODIFICATION FOR GLASS FIBER ADHERENCE

BACKGROUND OF THE INVENTION

This invention relates to a method of promoting resin to glass fiber adherence.

In one of its more specific aspects, this invention relates to a composite and to a method for improving glass fiber adherence to resins into which such fibers are incorporated for reinforcing purposes.

One highly successful glass fiber size is a coating comprising an oxidized polyolefin, a carboxylated high molecular weight elastomer having a solubility parameter similar to that of the oxidized polyolefin, and a silane coupling agent. This coating, when applied to glass fibers, facilitates the adherence of the glass fibers to the polyolefin composites into which the coated glass fibers are incorporated for reinforcing purposes.

In the aqueous based size composition, the preferred size comprises, in parts by weight, from 0.5 to 25 pbw of the oxidized polyolefin, from 0.5 to 15 pbw of the carboxylated elastomer, from 0.01 to 5 pbw of the silane coupling agent, with the balance being water.

It has recently been discovered that the introduction into the aforementioned size of certain organic acids in an amount within the range of from about 0.5 to about 4 weight percent, preferably about 2.25 weight percent improves certain properties of the resulting glass-resin composite.

There now has been discovered a still further modification of improving the adherence of glass in such resin composites.

STATEMENT OF THE INVENTION

According to this invention, there is provided a method of improving the adherence between a glass fiber and a cured polyolefin resin, the glass fiber having on its surface a coating comprising the residue obtained by removing water from an aqueous composition comprising an oxidized polyolefin, a carboxylated high molecular weight elastomer and a silane which comprises forming an uncured resin, sized glass and organic acid composite, the organic acid being selected from the group consisting of substituted benzoic acids, benzenedicarboxylic acids, benzenetrisorboxylic acids, benzenetetricarboxylic acids, benzenepentacarboxylic acids, benzenehexcarboxylic acids, cyclohexanedicarboxylic acids, fatty acids, aliphatic diacids, aliphatic polyacids, cinnamic acids, benzenediacrylic acids, benzenediacetic acids, naphthoic acid, naphthalenedicarboxylic acids and naphthalenedisulfonic acids or the anhydrides of said acids, and curing said composite.

In the preferred embodiment of this invention, the organic acid is terephthalic acid or isophthalic acid, either of which as such, will be incorporated into the composite in an amount within the range of from about 0.5 to about 4 weight percent. In the most preferred embodiment of the invention, the acid will be terephthalic acid which will be incorporated in the compositie in an amount of about 2.2 weight percent.

The organic acid can be added to the resin as a particular solid or with the sized glass at any point during the preparation of the final composite, that is, before heating the composite to cure the resin.

DESCRIPTION OF THE INVENTION

The method of this invention is employable with any size and type of glass fiber. It is also employable with any type of polyolefin resin including polypropylene, polyethylene and the like.

This invention can employ any suitable method of applying the size to the glass fiber and any suitable method of incorporating the resin, the sized glass fibers and the acid into a single composite.

In the preferred embodiment of the invention the size composition will be comprised of the following:

|  | % By Weight As Received | Lbs. Per 100 Gals. |
|---|---|---|
| Ammonium Hydroxide | 2.2 | 18.8 |
| Oxidized Polypropylene | 7.5 | 62.5 |
| Carboxylated Elastomeric Latex | 2.8 | 23.4 |
| Silane | 1.0 | 8.3 |
| Deionized Water | Balance | Balance |

The size can comprise any emulsified acid grafted or oxidized polypropylene latex. The polypropylene latex will be included in the size composition in an amount within the range of from about 0.5 to about 25 weight percent.

One suitable oxidized polypropylene latex is Epolene E-43 made by Eastman Chemical. This material is emulsified by Proctor Chemical, Salisbury, N.C., and the emulsion is called "Icopol OC".

Any suitable carboxylated high molecular weight latex having a solubility parameter similar to that of the oxidized polyolefin latex can be employed. This material will be included in the size composition in an amount within the range of from about 8.5 to about 15 weight percent.

One suitable material is available from Goodyear Tire and Rubber Company, Akron, Ohio as LPR-6599. This material comprises carboxylated stryene butadiene latex having an approximate styrene butadiene ratio of 65/35, a synthetic anionic emulsifier, a total solids content of 53, a Brookfield Viscosity of 150 cps., a pH of 8.5, a surface tension of 50 dynes/cm., a specific gravity of 1.022 and contains 8.5 pounds of latex. This material acts as a strand integrity agent and, while a material comparable to the above is preferred, other materials such as polyurethanes, epoxies, polyesters, poly (vinyl acetate) acrylics and combinations thereof can be employed.

Any suitable aminosilane can be employed. Suitable silanes include gamma-aminopropyltriethoxysilane, N-beta-aminoethyl) - gamma aminopropyltrimethoxysilane and polyamino functional silanes. Suitable materials include A1100, A1120 and A1130, respectively, all of which are available from Union Carbide Corporation, New York, N.Y. This material will be included in the size composition in an amount within the range of from about 0.1 weight percent to about 5 weight percent.

The size of the invention is prepared according to conventional methods with a base, such as ammonium hydroxide, being added at completion to adjust the resulting composite to a pH within the range of from about 8 to about 9 and a viscosity at 60° F. in the range of 10 to 20 cps.

The size can be applied to glass fibers using conventional methods. It will preferably be applied to the glass fiber in an amount to impart to the fiber a loss on ignition within the range of from about 0.2 to about 3.0 weight percent and, preferably, from about 0.7 to about 0.8 weight percent.

The sized glass strand will be dried and collected in the usual manner.

The combination of sized glass fibers, resin and acid can be formed in any suitable manner. A mixture of any two of the three components can be made and the third added thereto. Or, all three components can be combined simultaneously.

EXAMPLE I

An aqueous based sized previously described, but having no acid deposited therein, on a glass strand was incorporated in a polyproplene resin for reinforcement purposes.

A glass strand having an aqueous based size on its surface, a polypropylene resin and terephalic acid were mixed, the glass strand serving to reinforce the resin.

Results of tensile strength determinations on the molded resin were as follows:

| Trial | I | II |
|---|---|---|
| Acid Additive | None | Solid Terephthalic Acid |
| Acid Additive, Wgt. % | 0 | 0.5 |
| Tensile Strength psi* | 6738 | 8367 |

*Based on two trials, Trial II being higher than Trial I in both instances.

These data demonstrate that the addition of the acid directly into the sized glass-resin composite results in improved tensile strength properties in the reinforced molded resin.

It will be evident from the foregoing that various modifications can be made to the method of this invention. Such, however are considered within the scope of the invention.

We claim:

1. A method of improving the adherence between an uncured polyolefin resin and a sized glass fiber incorporated into said uncured resin as reinforcement and having on its surface a coating comprising the residue obtained by removing water from an aqueous composition comprising an oxidized polyolefin, a carboxylated high molecular weight elastomer and a silane which method comprises forming a mixture comprising an uncured polyolefin resin and said sized glass fiber and at least one acid selected from the group consisting of substituted benzoic acids, benzenedicarboxylic acids, benzenetricarboxylic acids, benzenetetracarboxylic acids, benzenepentacarboxylic acids, benzenehexacarboxylic acids, cyclohexanedicarboxylic acids, fatty acids, aliphatic diacids, benzenediacrylic acids, benzenediacetic acids, naphthoic acids, naphthalenedicarboxylic acids and naphthalenedisulfonic acids, said acid being added in an amount sufficient to increase the tensile strength of the glass-containing polyolefin resin after curing to a tensile strength greater than the tensile strength of the glass-containing cured resin in the absence of said acid, and molding said mixture to cure said uncured resin, and to incorporate said glass in said cured resin in reinforcing relationship.

2. The method of claim 1 in which said organic acid is terephthalic acid or isophthalic acid.

3. The method of claim 2 in which said organic acid is incorporated into said mixture in an amount within the range of from about 0.5 to about 4 weight percent.

4. The method of claim 3 in which said organic acid is incorporated into said mixture in an amount of about 2.2 weight percent.

5. The method of claim 1 in which said acid is added to a mixture of said resin and said sized glass fiber.

6. The method of claim 1 in which said resin is added to a mixture of said sized fiber and said acid.

7. The method of claim 1 in which said sized fiber is added to a mixture of said resin and said acid.

8. A cured resin formed by the method of claim 1 in which said acid is terephthalic acid.

9. A cured resin formed by the method of claim 1 in which said acid is isophthalic acid.

10. The article formed by the method of claim 1.

* * * * *

UNITED STATES PATENT AND TRADEMARK OFFICE
CERTIFICATE OF CORRECTION

PATENT NO. : 4,451,592

DATED : May 29, 1984

INVENTOR(S) : Denny E. Black/David W. Garret/ Thomas A. Coakley

It is certified that error appears in the above-identified patent and that said Letters Patent is hereby corrected as shown below:

Column 1, line 50 - first letter "a" was omitted from "benzenehexacarboxylic"

Column 1, line 65 - "particular" should read "particulate"

Signed and Sealed this

Eleventh Day of December 1984

[SEAL]

Attest:

GERALD J. MOSSINGHOFF

Attesting Officer     Commissioner of Patents and Trademarks

UNITED STATES PATENT AND TRADEMARK OFFICE
CERTIFICATE OF CORRECTION

PATENT NO. : 4,451,592

DATED : May 29, 1984

INVENTOR(S) : Denny E. Black, David W. Garrett & Thomas A. Coakley

It is certified that error appears in the above-identified patent and that said Letters Patent is hereby corrected as shown below:

Column 3, line 19 - "terephalic" should be "terephthalic"

Signed and Sealed this

Ninth Day of April 1985

[SEAL]

Attest:

DONALD J. QUIGG

Attesting Officer     Acting Commissioner of Patents and Trademarks